United States Patent [19]

Dürst

[11] Patent Number: 4,625,794

[45] Date of Patent: Dec. 2, 1986

[54] PLASTIC HEAT EXCHANGER CONSTRUCTION

[75] Inventor: Felix Dürst, Zürich, Switzerland

[73] Assignee: Norbert Allenspach, Switzerland

[21] Appl. No.: 653,790

[22] Filed: Sep. 21, 1984

[30] Foreign Application Priority Data

Sep. 30, 1983 [CH] Switzerland .................... 5323/83

[51] Int. Cl.⁴ .............................................. F28F 3/12
[52] U.S. Cl. .................................. 165/170; 126/445;
126/448; 165/144; 165/175
[58] Field of Search ............... 165/170, 178, 144, 174, 165/173, 175; 126/448, 445

[56] References Cited

U.S. PATENT DOCUMENTS

| 2,200,426 | 5/1940 | Lehman | 165/170 |
| 3,126,215 | 3/1964 | Raskin | 165/170 X |
| 4,046,136 | 9/1977 | Izumi et al. | 165/170 X |
| 4,243,020 | 1/1981 | Mier | 165/170 X |
| 4,296,804 | 10/1981 | Press et al. | 165/178 X |
| 4,353,355 | 10/1982 | Stewart | 126/448 X |
| 4,483,325 | 11/1984 | Siemiller | 165/170 X |

FOREIGN PATENT DOCUMENTS 36013   5/1926  Denmark ........................... 165/170
69359   4/1983  Japan .................................. 126/444

Primary Examiner—Sheldon J. Richter
Attorney, Agent, or Firm—McGlew and Tuttle

[57] ABSTRACT

A plastic heat exchanger comprises a single heat exchanger construction made up of a plate having two spaced apart walls and with a plurality of substantially parallel cross webs interconnecting the two walls which define a multiplicity of longitudinal heat transfer medium flow channels. The plate is assembled with a distribution and collection element which has spaced apart walls which are adapted to be arranged in abutting relationship with the walls of the plate and welded together with them to form a unit. The distribution and collecting element includes at least one heat transfer fluid plastic nipple inlet connection and at least one heat transfer fluid plastic nipple outlet connection. Advantageously, each unit may be interconnected by means of a plate which connects one nipple element of one distribution connecting element with a different nipple element of the next adjacent distribution and collection element. Advantageously the units are provided with inlets and outlets on each end and they may be easily interconnected with each transfer fluid connecting lines.

6 Claims, 11 Drawing Figures

PLASTIC HEAT EXCHANGER CONSTRUCTION

FIELD AND BACKGROUND OF THE INVENTION

This invention relates in general to heat exchangers and in particular to a new and useful plastic heat exchanger having two interconnectable parts.

The subject of the invention is a double-walled plastic heat exchanger having two mutually spaced plate walls with mutually parallel cross webs connecting the two mutually spaced plate walls, together a multiplicity of longitudinal channels is thus formed for a heat transfer medium. The channels have open ends communicating with distribution and collection elements fastened to at least one face of the heat exchanger plate. These elements in turn are provided with connections for the inlet and outlet of the heat transfer medium.

Known heat exchangers of a similar kind, usable e.g. as solar collectors or floor heating elements depending on material and design, have distribution and collection tubes which are perforated according to the channel pitch of the heat exchange plate and provided, in the area of a row of performations, with connecting flanges which, overlapping the plate face, are welded to the plate. Apart from the complicated design of these distribution and collection tubes, it has turned out that it is rather difficult to connect these tubes to the plate in a manner which is leak and pressure proof. In addition, the cross section of these tubes and, hence, the I.D. of the distribution and collection channel, must always be greater than that of the longitudinal channels of the heat exchange plate, which are only few millimeters wide. This causes undesirably high heat transfer medium pressures in these distribution and collection channels. It has also been suggested to design the performated distribution and collection tubes as a single piece, divided only by one cross web, and to weld these tubes to the edge of one plate face while a bypass channel is welded to the edge of the other plate face. These reverse flow heat exchangers must be joined together at the respective building site by welding adapter tubes to their distribution/collection tube which is open at both long plate sides to form the collector or absorber unit usually consisting of many individual heat exchangers, this is not only cumbersome, but in most cases gives no assurance of a leak and pressure proof connection.

SUMMARY OF THE INVENTION

All of these disadvantages are avoided in the heat exchanger according to the invention. For this purpose the invention is characterized in that the distribution and collection elements are plastic elements of U-shaped cross section, which are laterally closed, their I.D. corresponding approximately to that of the lingitudinal channels of the heat exchange plate and their legs limiting a through slot channel. The legs are butt-welded at their faces to one face of the heat exchange plate, the inlet and outlet connections being nipples forming integral parts of these plastic elements.

The heat exchanger design according to the invention can be prefabricated as a single-piece element and can be joined together with similar designs to form units by simple assembly (by connection of the appropriate nipples of several elements and connecting these nipples to supply and drain lines by means of pieces of tubing or hose, etc.). This is of particular advantage where large-area solar collector units or floor heating systems must be assembled at a building side from several such heat exchangers, for example. It has also turned out that, due to prefabrication in the shop, it is now easy to butt-weld the free faces of the distribution and collection elements of U-section to the respective face of the heat exchange plate, and that a leak and pressure proof connection is actually obtained. Another essential advantage is that, since to the channel I.D. of the distribution and collection elements is adapted to the I.D. of the longitudinal channels of the heat exchange plate, no pressure peaks can occur in the former which would stress the welds between these elements and the heat exchange plate in shear.

Accordingly an object of the invention is to provide an improved heat exchanger made of plastic parts including a double wall part and a distribution and collecting element which is connected to the double wall part by a heat welding of the edges of the adjacent walls, the double wall part being subdivided to form a plurality of heat transfer flow passages with a distribution and connecting part having one or more inlet and outlet nipples which may be readily interconnected to fluid lines.

A further object of the invention is to provide a heat exchanger which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
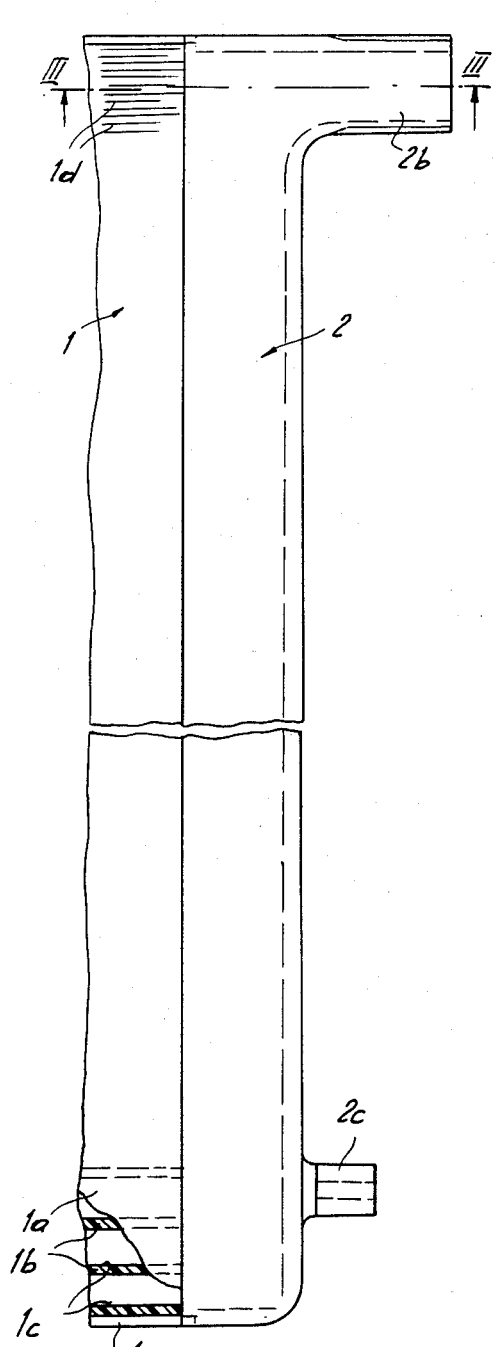
FIG. 1 is a top plan view of an end portion of heat exchanger according to the invention.
Figure 2:
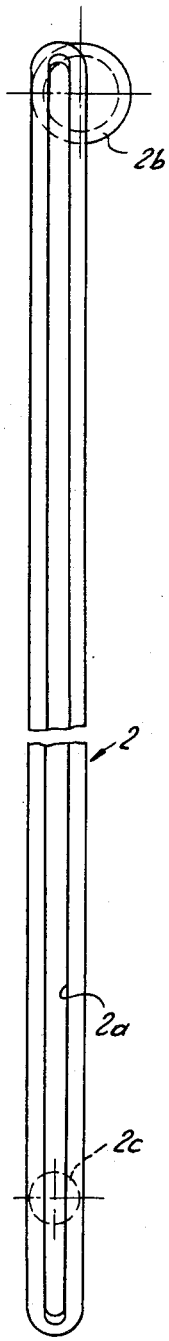
FIG. 2 is a front elevational view of the distribution and collection element of the example per FIG. 1.

The inventive heat exchanger according to FIGS. 1 to 4 has a heat exchange plate generally designated 1 which is formed by two mutually parallel walls 1a and cross webs 1b interconnecting the parallel walls and forming a multiplicity of longitudinal channels 1c therebetween. The legs of a distribution and collection element generally designated 2 are butt-welded to end faces of the two walls 1a of heat exchange plate 1. The distribution and collection channel of the element 2 is formed by a laterally closed, transverse through slot 2a which matches the inside width of the longitudinal channels 1c of the heat exchange plate 1, which terminate in the element 2

One element 2 is connected to each end face of plate 1. The elements 2 are U-shaped in longitudinal cross section and each have two legs.

Figure 3:
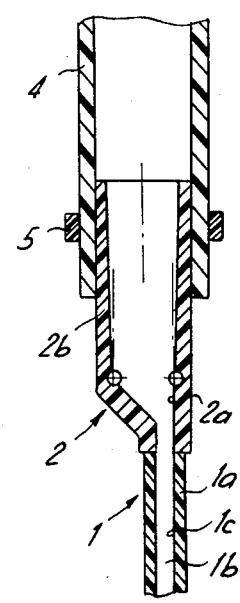
FIG. 3 is a section along line III—III of FIG. 1 with a connecting hose attached.
Figure 4:
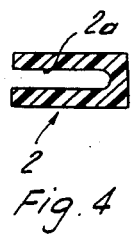
FIG. 4 is a section of the distribution and collection element of FIG. 2.
Figure 5:
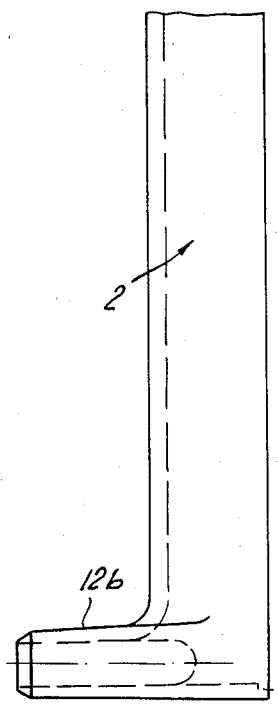
FIGS. 5 and 6 are partial plan and elevational views, analogous to FIGS. 1 and 2, of a first variant of the distribution and collection element.
Figure 6:
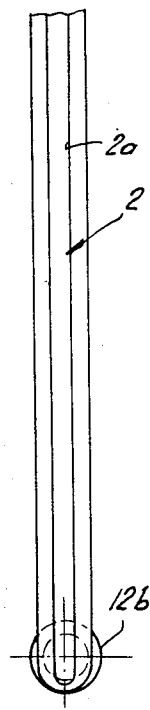
Figure 7:
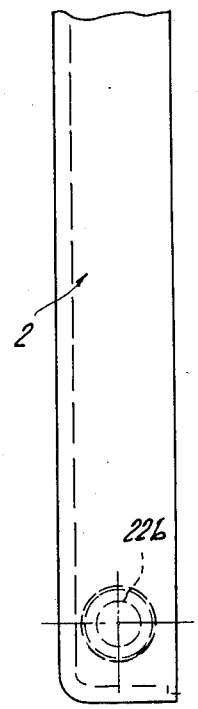
FIGS. 7 and 8 are partial plan and elevational views, analogous to FIGS. 5 and 6, of a second variant of the distribution and collection element.
Figure 8:
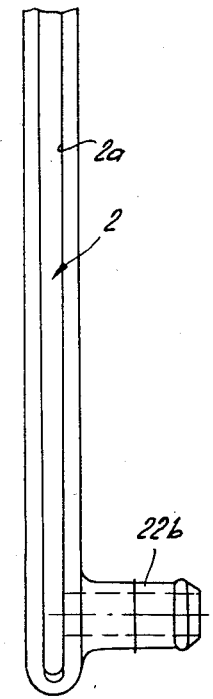

As may be seen in FIG. 3, the walls 1a of the heat exchange plate 1 are slightly thinner than the legs of the elements 2, making perfect butt-welding with sufficient strength of the distribution and collection elements 2 possible. At one end of each of the two elements 2 (laterally reversed) an inlet or outlet nipple 2b is integrally molded on. In the example shown, the nipple axis runs parallel to the longitudinal channels 1c of the heat exchange plate 1 and at one flat side of the distribution and collection element 2 the nipple projects beyond the contour of elements 2 while being flush with it at the other flat side and at the narrow side of this element. It should be noted that the nipples 2b of the distribution and collection elements 2, that are welded to the two end faces of the heat exchange plate 1, project beyond the same flat side of this plate. Provided in the area of the other end of the two elements 2 is a plug 2c approximately matching the thickness of these elements and being axis-parallel to the nipple 2b.

Figure 10:
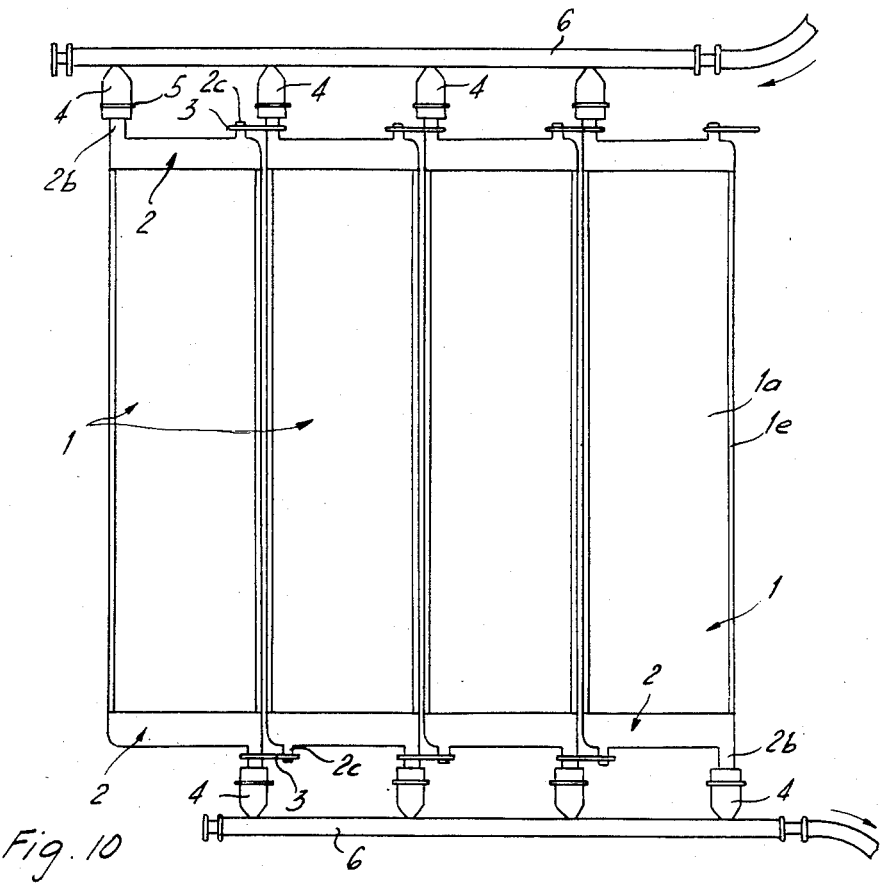
FIG. 10 is a schematic top plan view of a unit formed of several paralleled heat exchangers according to FIG. 1.
Figure 11:
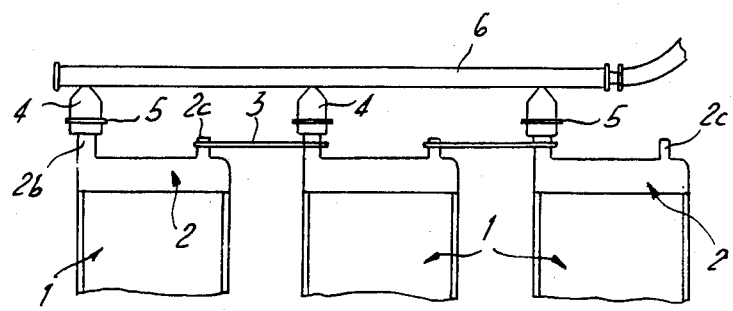
FIG. 11 is a partial plan view showing a variant of FIG. 10.

It is possible, for instance, to contruct a floor heating system such as schematically shown in FIGS. 10 and 11 from inventive heat exchangers that consist completely of plastic. Therein, the heat exchangers 1, 2 are juxtaposed in the desired number and are firmly connected in this position, forming a flat floor surface. For this purpose, two connecting plates 3 with two fitting holes each, are provided to accept the nipple 2b of the one heat exchanger 2 on the one hand and the plug 2c of the adjacent heat exchanger on the other. This assures a perfect connection of the heat exchangers. In a manner to FIG. 3, one end of and plastic connecting tube 4 is plugged to the nipple 2b of each heat exchanger and is fixed thereto e.g. by a tie 5. The other end of these connecting tubes 4 is tapered and welded into corresponding holes of a plastic supply or drain line 6 shown in FIGS. 10 and 11. Assembling such a floor heating system is particularly simple because all welds (connecting the tubes 4 to the lines 6 and connecting the elements 2 to the plate 1) can be made in the shop, requiring at the building side only the installation and connection of these prefabricated parts. As FIGS. 11 shows, by using longer plates 3a and a correspondingly greater pitch of the tubes 4 attached to the lines 6, it is also possible to construct a system with greater and/or different mutual spacings of the individual heat exchangers.

It is mentioned for the sake of completeness that not only may there be provided, as in the embodiments shown, parallel flow heat exchangers where the element 2 is connected to the supply line at one face of the heat exchange plate 1 and the other element 2 to a drain line at the other face of plate 1, but that reverse flow embodiments are also possible; in that case, the longitudinal channels of the heat exchange plate are separated from each other on the one face of the plate by providing a center partitioning web in the distribution and collection element while they are connected to each other via the element 2 on the other face. In this case the element, divided by the participating web into a distribution channel and a collection channel, must be provided at both ends with a connecting nipple whereas the reversing elements at the other plate face needs no nipple.

Kind and location of the connecting nipples on the distribution and collection elements may differ, depending on the application and the way the heat exchanger is assembled; two appropriate variants are shown in FIGS. 5 to 8. According to FIGS. 5 and 6, for instance, the axis of nipple 12b lies in the center plane of the element 2 while according to FIGS. 7 and 8 the nipple 22b projects perpendicular to the center plane of element 2 away from the latter's one flate side. This makes it possible in simple manner to connect such heat exchangers also so as to be superposed or juxtaposed.

Figure 9:
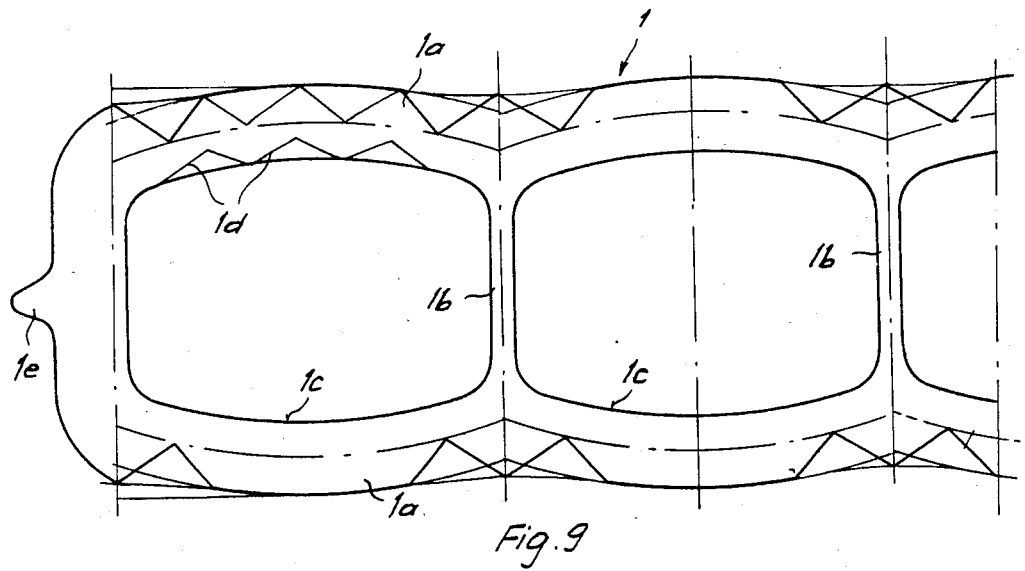
FIG. 9 is a front elevational view of a part of a heat exchange plate on a larger scale.

To keep the heat exchange at an optimum it is expedient to equip the walls 1a of the heat exchange plate with ribs 1d or grooves in longitudinal directions (FIGS. 1 and 9). External ribs are of special advantage whenever the heat exchanger is used as solar collector because this not only enlarges the heat absorbing area, but also makes it possible to achieve a more favorable angle of incidence of the sun rays. But internal ribs also lead in any case to an enlargement of the wall surface participating in the heat transfer. As FIG. 9 shows, the parts of the two plate walls 1a defining the individual channels are expediently arched outwardly slightly and their transitions into the relatively thin cross webs 1b are rounded. This makes for a relatively stiff plate structure despite a thin wall thickness.

Provided at each of the long narrow sides of the heat exchanger 1 is a narrow longitudinal rib 1e. When juxtaposing several heat exchangers, e.g. according to FIG. 10, these longitudinal ribes 1e close the gap between adjacent heat exchanger plates and may also serve as a mutual bearing surface.

While specific embodiments of the invention have been shown and described in detail to illustrate the application of the principles of the invention, it will be understood that the invention may be embodied otherwise without departing from such principles.

What is claimed is:

1. A plastic heat exchanger, comprising a plate portion having two spaced apart walls with a plurality of substantially parallel cross webs interconnecting said walls and defining a plurality of longitudinally extending heat transfer medium flow channels, and a distribution and collecting element having spaced apart legs abutting the ends of the plate walls and being welded thereto, said distribution and collecting element having at least one of a heat transfer fluid plastic nipple inlet connection and a heat transfer fluid plastic nipple outlet connection, said distribution and collection element being of U-shaped cross section and closed at each end having a spacing of the legs forming the U-shaped cross section which is substantially equal to the spacing of the walls of said plate at least adjacent portions thereof abutting said plate walls, said distribution and collecting element having wall thickness which is slightly greater than the wall thickness of said heat exchange plate walls.

2. A heat exchanger according to claim 1, wherein at least one of the outside surface and the inside surface of said plate has longitudinal ribs in addition to said walls defining logitudinal channels.

3. A heat exchanger according to claim 1, wherein said nipple at one end of said distribution and collecting elements projects away from the back of the element and has an axis parallel to the plan of said plate.

4. A heat exchanger according to claim 3, wherein said connecting nipple has a diameter greater that the inside width of said distribution and collecting element, said nipple being flush with said element at both ends and at a flat side of said element.

5. A heat exchanger according to claim 4, wherein said distribution and collection element facing away from its associated nipple includes a plug having an axis parallel to the nipple axis for the purpose of connecting an adjacent heat exchanger, including an adjacent heat exchanger similar to said heat exchanger with the plug of one distribution and collecting element of one heat exchanger being connectable to the conencting nipple of the distribution and collecting element of the adjacent heat exchanger by a connecting plate.

6. A heat exchanger according to claim 5, wherein said heat exchanger plate has a longitudinal rib provided at its elongated end side.

* * * * *